United States Patent
Hedges et al.

(10) Patent No.: US 10,179,359 B2
(45) Date of Patent: Jan. 15, 2019

(54) JOINING METHOD OF COMPOSITE PARTS HAVING A THERMOSET MATRIX, AND WIND TURBINE BLADE MANUFACTURED USING THIS SAID METHOD

(75) Inventors: Andrew Hedges, Southampton (GB); Kim Sylvester Nielsen, Tarm (DK)

(73) Assignee: Vestas Wind Systems A/S, Aarhus N. (DK)

(*) Notice: Subject to any disclaimer, the term of this patent is extended or adjusted under 35 U.S.C. 154(b) by 1119 days.

(21) Appl. No.: 13/520,972

(22) PCT Filed: Jan. 7, 2011

(86) PCT No.: PCT/DK2011/050005
§ 371 (c)(1),
(2), (4) Date: Mar. 29, 2013

(87) PCT Pub. No.: WO2011/085730
PCT Pub. Date: Jul. 21, 2011

(65) Prior Publication Data
US 2013/0189112 A1     Jul. 25, 2013

Related U.S. Application Data

(60) Provisional application No. 61/294,489, filed on Jan. 13, 2010.

(30) Foreign Application Priority Data

Jan. 12, 2010 (DK) .................. 2010 70012

(51) Int. Cl.
*F01D 5/14* (2006.01)
*B21D 53/78* (2006.01)
(Continued)

(52) U.S. Cl.
CPC .............. *B21D 53/78* (2013.01); *B29C 65/48* (2013.01); *B29C 66/1122* (2013.01);
(Continued)

(58) Field of Classification Search
CPC .................................................. B29C 66/1122
(Continued)

(56) References Cited

U.S. PATENT DOCUMENTS

| | | | |
|---|---|---|---|
| 2,588,570 A | 3/1952 | Pitacairn | |
| 2010/0062238 A1* | 3/2010 | Doyle | B29C 70/02 428/295.1 |
| 2013/0129518 A1* | 5/2013 | Hayden | F03D 1/0675 416/226 |

FOREIGN PATENT DOCUMENTS

| | | |
|---|---|---|
| DE | 102005050925 A1 | 4/2007 |
| DE | 102007062529 A1 | 6/2009 |

(Continued)

OTHER PUBLICATIONS

English Machine Translation of DE102005050925 of Scharr Gerhard; Jan. 10, 2015.*

(Continued)

*Primary Examiner* — Audrey K Bradley
*Assistant Examiner* — Anthony Ayala Delgado
(74) *Attorney, Agent, or Firm* — Wood Herron & Evans LLP

(57) ABSTRACT

A method of fabricating a composite joint from a first cured composite component (13) and a second cured composite component (14), the first and second cured composite components (13, 14) comprising fiber elements embedded in a thermoset resin matrix; the method comprising the steps of providing an adhesive (15) on at least one of the first and/or second composite components (13, 14); forming a joint region between the first and second composite component (Continued)

by bringing the first and second composite component into contact with each other with the adhesive (15) therebetween; applying a force to the joint region (16, 17); and heating the first composite component in the joint region to a temperature above the glass transition temperature of the thermoset resin matrix of the first composite component.

5 Claims, 2 Drawing Sheets

(51) Int. Cl.
| | |
|---|---|
| *B29C 65/48* | (2006.01) |
| *B29C 65/00* | (2006.01) |
| *F03D 1/06* | (2006.01) |
| *F03D 3/06* | (2006.01) |
| *B29C 65/10* | (2006.01) |
| *B29K 101/10* | (2006.01) |
| *B29K 105/06* | (2006.01) |
| *B29K 105/24* | (2006.01) |
| *B29L 31/08* | (2006.01) |

(52) U.S. Cl.
CPC .......... *B29C 66/4326* (2013.01); *B29C 66/54* (2013.01); *B29C 66/721* (2013.01); *B29C 66/73118* (2013.01); *B29C 66/73754* (2013.01); *B29C 66/73756* (2013.01); *B29C 66/73941* (2013.01); *B29C 66/91411* (2013.01); *B29C 66/91943* (2013.01); *F03D 1/0675* (2013.01); *F03D 3/062* (2013.01); *B29C 65/10* (2013.01); *B29C 66/71* (2013.01); *B29C 66/7212* (2013.01); *B29C 66/919* (2013.01); *B29C 66/91413* (2013.01); *B29K 2101/10* (2013.01); *B29K 2105/06* (2013.01); *B29K 2105/24* (2013.01); *B29L 2031/082* (2013.01); *B29L 2031/085* (2013.01); *Y02E 10/721* (2013.01); *Y02P 70/523* (2015.11); *Y10T 29/49336* (2015.01)

(58) Field of Classification Search
USPC .......................................................... 416/226
See application file for complete search history.

(56) References Cited

FOREIGN PATENT DOCUMENTS

| | | |
|---|---|---|
| GB | 2033394 A | 5/1980 |
| WO | 2006028548 A2 | 3/2006 |
| WO | 2009153341 A2 | 12/2009 |
| WO | 2009156064 A2 | 12/2009 |

OTHER PUBLICATIONS

International Bureau, International Preliminary Report on Patentability issued in corresponding PCT/DK2011/050005 dated Jul. 17, 2012, 7 pages.
European Patent Office, International Search Report from counterpart PCT Application No. PCT/DK2011/050005 dated Apr. 28, 2011, 11 pages.
Danish Patent and Trademark Office, Danish Office Action issued in corresponding Danish Application No. PA201070012 dated Aug. 25, 2010, 4 pages.
European Patent Office Patent Translate website, Machine Translation of previously cited DE1020050509256 generated Jan. 20, 2016.
European Patent Office, Opposition to European Patent 2523798, dated Sep. 13, 2017.
Schulze, Juliana, Polyurethan-Klebstoff ermöglicht effiziente Rotorbloatt-Herstellung, Konstruktionspraxis, Dec. 17, 2009.
Chensong Dong, Process-Induced Deformation of Composite T=Stiffener Structures, 11th Japan International SAMPE Symposium and Exhibition, 2009, Documents E-6/E6a.
Goodman, Sidney H., Handbook of Thermoset Plastics, Westwood, New Jersey, USA: Noyes Publications, 1998, 2nd ISBN: 0-8155-1421-2, pp. 303-378.
Goodman, Sidney H., Handbook of Thermoset Plastics, Westwood, New Jersey, USA: Noyes Publications, 1998, 2nd ISBN: 0-8155-1421-2, pp. 379-467.

\* cited by examiner

JOINING METHOD OF COMPOSITE PARTS HAVING A THERMOSET MATRIX, AND WIND TURBINE BLADE MANUFACTURED USING THIS SAID METHOD

TECHNICAL FIELD

The present invention relates to a method of joining two composite components together. In particular, the present invention relates to joining two composite components together such that stress concentrations are minimised or avoided in the joint region.

BACKGROUND

When large composite components, such as those components used in the manufacture of wind turbine blades are assembled, there is often the problem that stress concentrations can be created in the joint region. For example, in a wind turbine blade, the structural spar section may be up to 50 m in length and have a width of up to 2 meters. Such a spar may be formed in a box configuration from four components, two spar caps separated by two shear webs. The individual composite components are pre-made, that is they are cured composite components and therefore stiff.

Due to the large size of the composite components involved, each individual composite component can be difficult and expensive to mould accurately enough for future accurate assembly. For instance, in a manufacturing plant having a production line, many moulds may be used to fabricate the same composite component. However, there may be variations between the different moulds such that when the composite components are to be assembled they are not all identical. This can result in a less accurate fit at a joint, with variations in three spatial dimensions.

It is known in the prior art to overcome the above issues by filling up the gaps between the composite components to be joined by using an adhesive as a filler. However, this process results in an unpredictable adhesive usage which may result in the joint having a reduced strength.

It is also known in the prior art to assemble the composite components together and apply a clamping force so that the components are forced together. The clamping force removes any gaps that may exist between the two components and thus results in uniform adhesive usage. However, this approach creates a preload at the joint as each composite component will tend to try to deform to its original shape. These preloads result in residual stresses which may structurally weaken the joint.

It is an aim of the present invention to create a composite joint which does not create residual stresses and which can have a uniform and pre-determined adhesive usage.

Summary

According to the present invention there is provided a method of fabricating a composite joint from a first cured composite component and a second cured composite component, the first and second cured composite components comprising fibre elements embedded in a thermoset resin matrix; the method comprising the steps of:

providing an adhesive on at least one of the first and/or second composite components;

forming a joint region between the first and second composite components by bringing the first and second composite component into contact with each other with the adhesive therebetween;

applying a force to the joint region; and heating the first composite component in the joint region to a temperature above the glass transition temperature of the thermoset resin matrix of the first composite component.

The step of heating the first composite component to a temperature above the glass transition temperature of the thermoset resin matrix of the first composite component reduces the stiffness of the first composite component. Accordingly, when the two composite components are brought together under a force, the first composite component may deform slightly to account for any variations in fit between the two composite components. As the heating of the first composite component takes place above the glass transition temperature, any stress concentrations are minimised or avoided.

Furthermore, as the two composite components will now be joined together with no variations in fit, a predetermined amount of adhesive can be used for the joint. This is important in keeping a consistent level of quality and lack of variation between many fabricated joints.

A thermoset resin matrix is formed from network-forming polymers. When the resin is cured, which may be under heat and vacuum, the resin undergoes an increase in viscosity and the polymer chains cross link and set, such that the resin can no longer flow. This change is not reversible. After curing the composite part, the thermoset resin has a characteristic glass transition temperature. If the composite component is heated to above this temperature, the component will soften. The component will not melt on further heating, it will instead deteriorate if the applied temperatures are too high. The glass transition temperature may be established by use of the dynamic mechanical thermal analysis (DMTA) method.

In use, the temperature applied may be up to 70 degrees centigrade higher than the glass transition temperature of the thermoset matrix. However, the applied temperature should be lower than the temperature where thermal degradation of the composite occurs.

The step of applying a force to the joint region encompasses any means by which the two composite components can be brought together. In a particular example, this may be a clamp.

The method may further comprise the step of heating the second composite component in the joint region to a temperature above the glass transition temperature of the thermoset resin matrix of the second composite component. By heating both composite components to above the glass transition temperature allows both composite components to deform slightly so that any variations in fit between the two components are minimised.

A spar for a wind turbine blade may be provided with the spar comprising a composite joint fabricated according to the method described above.

A wind turbine blade comprising the spar may be provided.

A wind turbine may be provided having at least one wind turbine blade as described above. Such a wind turbine may be a horizontal axis three bladed turbine of the type known as the "Danish design".

BRIEF DESCRIPTION OF THE DRAWINGS

The invention will now be described by way of example only, with reference to the following Figures in which.

DETAILED DESCRIPTION

Figure 1:
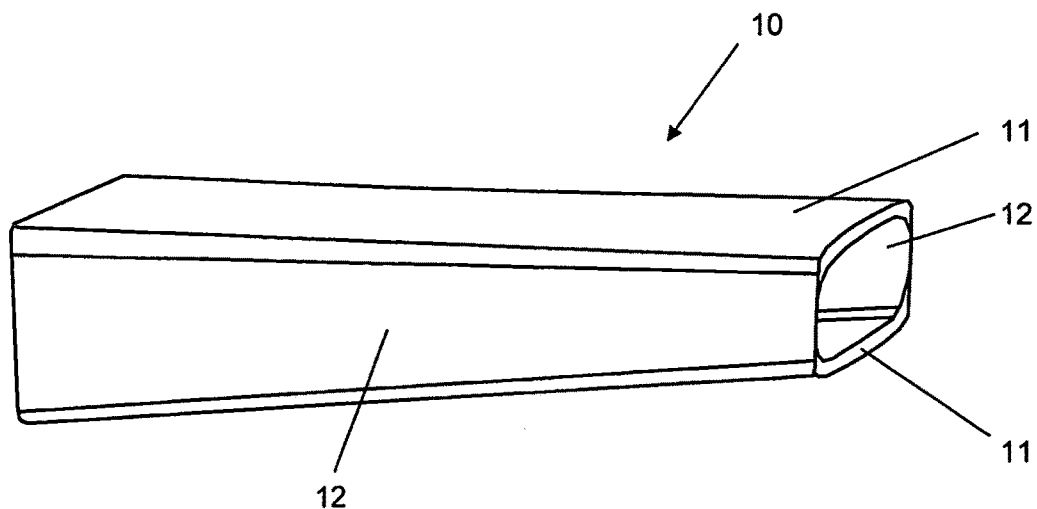
FIG. 1 is a perspective view of a spar for a wind turbine blade.

FIG. 1 shows a spar 10 for a wind turbine blade (not shown). Although the invention is applicable to the joining of any two cured composite parts, this example is described with reference to a wind turbine blade component. The spar 10 is a structural member that extends along the length of a wind turbine blade from a root end of the blade to a tip end of the blade. In use, an aerodynamic shell is fixed to the spar to create the wind turbine blade.

The spar 10 comprises two spar caps 11 and two shear webs 12 arranged in a box shape. The spar caps 11 are fixed to the aerodynamic shells (not shown) and the shear webs 12 maintain the distance between the two spar caps.

The spar caps 11 and the shear webs 12 are pre-manufactured in a mould prior to being assembled into the spar 10. In this example, the spar caps 11 are formed from carbon fibre embedded in a thermoset resin matrix and the shear webs 12 are formed from glass fibre embedded in a thermoset resin matrix. The spar caps 11 and the shear webs 12 are fabricated in a mould and then cured so that they are solid components prior to being assembled into the spar 10. The fabrication of the spar caps 11 and the shear webs 12 can be done by any well known composite manufacturing method known in the art, i.e. using prepreg technology or resin infusion.

Figure 2:
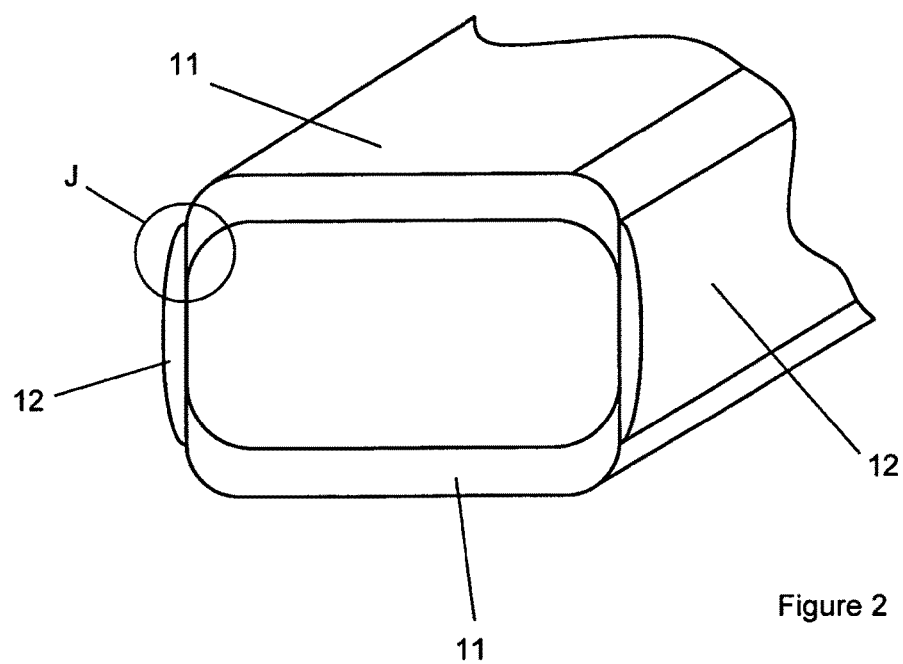
FIG. 2 is a cross sectional view of a spar for a wind turbine blade.

As shown in FIG. 2, the shear webs 12 are fixed to the spar caps 11 in a joint region "J" which extends along the length of the spar. Owing to the large size of the spar caps 11 and the shear webs 12, which may be up to 50 m in length, there may be variations in the fits of the components when they are assembled as described above, which may create stress concentrations in the joint region "J".

Figure 3:
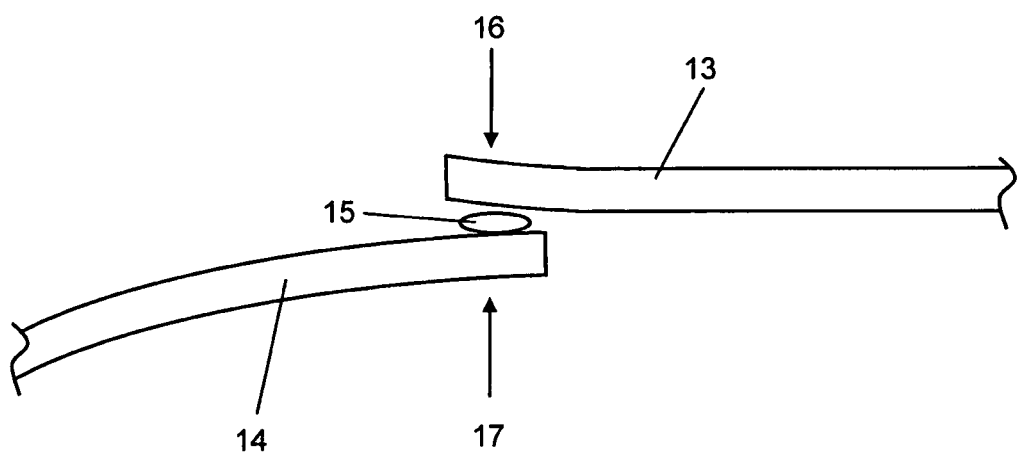
FIG. 3 is a schematic view of a joint according to an example of the present invention.

FIG. 3 shows a schematic view of a joint region according to the invention. In this example, a first cured composite component 13 is being joined to a second cured composite component 14. Due to the manufacture of the composite components 13, 14, there are variations in fit between the two parts as can be seen in an exaggerated form in FIG. 3.

The first and second component 13, 14 are arranged next to each other in the joint region and a predetermined amount of adhesive 15 is placed between them. The adhesive may be, for example, epoxy or polyurethane. The joint is formed by applying heat and pressure at the joint region as indicated by the arrows 16 and 17.

By heating the composite component to above the glass transition temperature (Tg) of the thermoset matrix allows the stiffness of the composite component to reduce. This results in a reduced force required to fit the two composite components together. When the composite component is heated to above the glass transition temperature of the thermoset matrix, the polymer chains of the thermoset resin are allowed to move, which relaxes the preloads caused by the pressure required to force the composite components 13, 15 together. This results in a reduced likelihood of a stress concentration and allows a predetermined amount of adhesive to be used.

In this embodiment, the first composite component 13 is a cured spar cap formed from carbon fibre embedded in a matrix of epoxy resin which has a Tg of 130 degrees centigrade, and the second composite component 14 is a cured shear web formed from glass fibre embedded in a matrix of epoxy resin which has a Tg of 60 degrees centigrade.

In a first example, the second cured composite component 14 is heated to above the glass transition temperature of the thermoset resin of the second composite component 14. Heat is applied as indicated at 17 at a temperature of 70 degrees centigrade. The heat may be applied from a hot air blower or a heat mat. The application of heat reduces the stiffness of the second composite component 14 which results in a reduced force required to fit the two composite components together as described above.

In a second example, both composite components 13, 14 are heated to above the glass transition temperature of the thermoset resin of each composite component. Heat is applied as indicated at 16 at a temperature of 140 degrees centigrade and heat is applied as indicated at 17 at a temperature of 70 degrees centigrade. In this example, the stiffness of both composite components will be reduced and the clamps, which force the components 13, 14 together may determine the final shape of the joint.

In a third example, heat is applied only as indicated at 16 at a temperature of 140 degrees and the heat will transfer from the first composite component 13 to the second composite component 14. As the applied heat is at a temperature higher than the Tg of both thermoset resins of each composite component, the stiffness of both composite components will be reduced.

The invention claimed is:

1. A method of fabricating a composite joint from a first cured composite component and a second cured composite component, the first and second cured composite components comprising fibre elements embedded in a thermoset resin matrix, the method comprising:
   forming a joint region between the first and second composite components by bringing the first and second composite component into contact with each other;
   applying a force to the joint region;
   reducing variations in fit between the first and second composite components by heating the first composite component in the joint region to a temperature above the glass transition temperature of the thermoset resin matrix of the first composite component when force is being applied to the joint region;
   selecting a predetermined amount of adhesive based on the variation in fit between the first and second composite components being reduced;
   applying the predetermined amount of adhesive on at least one of the first and second composite component; and
   coupling the first and second composite components together at the joint region using the predetermined amount of adhesive.

2. A method of fabricating a composite joint in accordance with claim 1, further comprising heating the second composite component in the joint region to a temperature above the glass transition temperature of the thermoset resin matrix of the second composite component.

3. A spar for a wind turbine blade, the spar comprising a composite joint fabricated according to the method of claim 1.

4. A wind turbine blade comprising a spar according to claim 3.

5. A wind turbine having at least one wind turbine blade according to claim 4.

* * * * *